3,530,106
COPOLYMER OF ISOBUTYLENE AND 5-METHYL-HEPTATRIENE-1,3,6 AND A PROCESS FOR THE PRODUCTION OF SAME
Mitsuo Ichikawa, Yokkaichi-shi, and Yoshitada Kagawa and Koichiro Shimizu, Matsuzaka-shi, and Akira Kogure, Yokkaichi-shi, Japan, assignors to Japan Synthetic Rubber Co., Ltd., Tokyo, Japan
No Drawing. Filed Dec. 12, 1967, Ser. No. 689,765
Claims priority, application Japan, Dec. 13, 1966, 41/81,387
Int. Cl. C08f 15/04
U.S. Cl. 260—88.2
16 Claims

ABSTRACT OF THE DISCLOSURE

A process for producing a copolymer of isobutylene and 5-methylheptatriene-1,3,6 which comprises contacting a mixture of isobutylene and 5-methylheptatriene-1,3,6 with a catalyst prepared by mixing (1) titanium tetrachloride, and (2) at least one compound selected from the group consisting of (a) phenols and (b) organic carboxylic acids having a strong acidity, in an aliphatic hydrocarbon solvent.

BACKGROUND OF THE INVENTION

Field of the invention

This invention relates to a new copolymer of isobutylene and 5-methylheptatriene-1,3,6 and a process for producing the same.

Description of the prior art

Heretofore, various kinds of copolymers prepared from isobutylene and multiolefins have been known in the literature such as "Polyisobutylen und Isobutylen-Mischpolymerisate" by Hermann Guterbock, published by Springer-Verlage, Inc., in 1959.

There is not known, however, a copolymer of isobutylene and 5-methylheptatriene-1,3,6. Those known copolymers of isobutylene and multiolefins are not satisfactorily used in practice due to the fact that some of the multiolefins are not easy to copolymerize with isobutylene and some of the copolymers have a low cure rate and poor physical properties when they are vulcanized. Only a copolymer of isobutylene and isoprene has been produced commercially, though it has some faults that need to be improved.

It is relatively easy to vulcanize highly unsaturated rubbers such as natural rubber, styrene-butadiene rubber (SBR), cis-polyisoprene rubber, and polybutadiene rubber, but a copolymer of isobutylene and isoprene, so called "butyl rubber," generally has a very low degree of unsaturation, such as, less than 2 percent. Therefore, vulcanization of butyl rubber is relatively difficult and the cure state tends to reverse.

The reason why butyl rubber has a low degree of unsaturation is that the monomer reactivity ratio of isoprene to isobutylene is small, and that when a large amount of isoprene is used, the the molecular weight of the resulting copolymer is decreased to such an extent that the copolymer cannot be used as a rubber.

Accordingly, one of the objects of this invention is to provide a copolymer of isobutylene and 5-methylheptatriene-1,3,6 which has a high degree of unsaturation, is easy to vulcanize, and has a reduced tendency of reversion of the cure state.

Another object of this invention is to provide a new process for copolymerizing isobutylene and 5-methylheptatriene-1,3,6. These and still further objects will become apparent from the description of the invention to follow.

SUMMARY OF THE INVENTION

In accordance with this invention, a copolymer of isobutylene and 5-methylheptatriene-1,3,6 is obtained by contacting a mixture of isobutylene and 5-methylheptatriene-1,3,6 with a catalyst prepared by mixing (1) titanium tetrachloride and (2) a compound selected from the group consisting of (a) phenols and (b) organic carboxylic acids having a strong acidity, in an aliphatic hydrocarbon solvent.

DETAILED DESCRIPTION OF THE INVENTION

It has now been found that by using the catalyst of this invention, 5-methylheptatriene-1,3,6 (hereinafter referred simply to a methylheptatriene) can easily copolymerize with isobutylene, especially almost in the same ratio of the monomers as charged, when a relatively small amount of methylheptatriene is used. For example, when methylheptatriene is used in an amount of 5% per mole based on the total monomers, there is obtained a copolymer having the same methylheptatriene content and correspondingly about 10% of the unsaturation degree.

The amount of methylheptatriene to be used in this invention can vary in a wide range, but is preferably from about 0.5 to 15% per mole of the total monomers. But if desired, 20% per mole or more, for example 50% per mole of methylheptatriene can be copolymerized with isobutylene.

Generally, by increasing the amount of methylheptatriene used, the molecular weight of the formed copolymer is gradually decreased, but since in the process of this invention a particular solvent and catalyst are used, as described in detail hereinafter, the extent of decrease of the molecular weight of the copolymer formed is rather smaller than with the product obtained by known processes. On the contrary, by changing the monomer concentration in an adequate range, it is possible to increase the molecular weight of the copolymer.

Said methylheptatriene, which has been recently synthesized for the first time by G. Wilke (Austrian Pat. No. 219,580), can be produced by dimerizing butadiene in an excellent yield at a relatively low cost.

The solvent to be used in the process of this invention is an aliphatic hydrocarbon. As the aliphatic hydrocarbon which is inert to the catalyst and is liquid at the reaction conditions employed may be used. But, generally, saturated hydrocarbons have from 3 to 6 carbon atoms, such as propane, butane, pentane and hexane are preferable. If desired, isobutylene which is the monomer to be polymerized, may also be used as a solvent of the reaction. When isobutylene itself is used as the solvent, in other words when no solvent is used except monomers, the advantages described below may be obtained. Therefore, the term "aliphatic hydrocarbon solvent" used in this specification should include the monomeric isobutylene itself.

It has been found that when halogenated hydrocarbons, such as, methylene chloride which is used as the solvent in the known butyl rubber production, is used in the production of said isobutylene-methylheptatriene copolymer, the molecular weight of the formed copolymer is far smaller than that of the copolymer obtained by the process of this invention.

The catalyst of this invention may be prepared by mixing titanium tetrachloride and one or more phenols or organic carboxylic acids having strong acidity in a hydrocarbon solvent, preferably in said aliphatic hydrocarbon solvent. The catalyst may also be prepared by mixing the said catalyst components in a reaction vessel in the presence of the solvent and monomers. The ratio of said catalyst components may vary in a wide range, but phenols or organic carboxylic acids may be used in an amount from 0.05 to 5 moles per one mole of titanium tetrachloride.

Titanium tetrachloride itself has no catalytic activity in a completely anhydrous state, but catalytic activity appears when phenols or organic carboxylic acids are added thereto. The catalytic activity increases with the amount of phenols or organic carboxylic acids added, and are constant at maximum when about two moles or more of phenols or organic carboxylic acids are used per one mole of titanium tetrachloride. On the other hand, the molecular weight of the formed copolymer decreases with the amount of phenols or organic carboxylic acids added, and are constant at minimum when two moles or more of phenols or organic carboxylic acids are used per one mole of titanium tetrachloride. Therefore, preferred ratio of said catalyst components is from 0.1 to 2 moles of phenols or organic carboxylic acids per one mole of titanium tetrachloride.

As for the phenols to be used in the preparation of the catalyst, mononuclear phenols, such as, phenol, catechol, resorcine, and hydroquinone are preferred. More specifically, mononuclear monohydric phenols having the general formula:

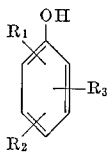

wherein each $R_1$, $R_2$ and $R_3$ is hydrogen, methyl group, nitro group, or chlorine, are preferred.

Preferred examples of the phenols include phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,4-dinitrophenol, picric acid, m-chlorophenol and 2,4,6-trichlorophenol.

As the organic carboxylic acids having strong acidity, those having a value of $-\log K$ less than 5, wherein K is the dissociation constant of the acid at 25° C., such as, formic, acetic, propionic, n-butyric, isobutyric, n-valeric, caproic, n-heptylic, caprylic, pelargonic, fluoroacetic, chloroacetic, bromoacetic, iodoacetic, dichloroacetic, trichloroacetic, α-chloropropionic, β-chloropropionic, glycolic, lactic, methoxyacetic, thioglycolic, cyanoacetic, malonic, phenylacetic, oxalic and maleic aids, are preferred.

More preferred organic carboxylic acids are those having a value of $-\log K$ less than 4, such as formic, fluoroacetic, chloroacetic, bromoacetic, iodoacetic, dichloroacetic, trichloroacetic, α-chloropropionic, glycolic, lactic, methoxyacetic, thioglycolic, cyanoacetic, malonic, and oxalic acids.

Among these organic carboxylic acids an acid which dissolves easily in an aliphatic hydrocarbon solvent, such as, formic acid, dichloroacetic acid and trichloroacetic acid, is more preferable.

The polymerization reaction of this invention may be conducted by contacting a mixture of isobutylene and methylheptatriene with said catalyst in said aliphatic hydrocarbon solvent. Said polymerization reaction may be conducted generally at a temperature from —50° C., to —130° C., preferably from —80° to —110° C., more specifically from —90 to —110° C. The polymerization is generally conducted under an atmosphere of an inert gas, such as, nitrogen.

In general, Friedel-Craft's catalysts need, as is well known, a trace amount of water to be in an active state, but the catalyst of this invention needs no water, though a trace amount of water can be present in the reaction mixture.

The amount of the catalysts used is generally from about 0.5 to about 5 millimoles of titanium tetrachloride per one mole of the total monomers.

The amount of the solvent used is not critical and as said above, in some cases, the polymerization reaction may be conducted without solvent, or in other words, the reaction may be carried out in bulk.

One of the special and characteristic features of this process is the relation between the ratio of monomer to solvent, and the molecular weight of the copolymer and the conversion of the monomers.

Generally speaking, when isobutylene is homopolymerized or copolymerized with multiolefins, such as, isoprene or methylheptatriene, in a halogenated hydrocarbon solvent, such as, methylene chloride, in the presence of a Friedel-Craft's catalyst, such as, aluminum trichloride, the conversion of the monomers decreases and the molecular weight of the polymer formed are constant with the increase of the monomer concentration.

This is also true in the case when aluminum trichloride is used as a catalyst and the same solvent used in the process of this invention is used as a solvent, or in the case when the catalyst of this invention is used as a catalyst and a halogenated hydrocarbon is used as a solvent.

On the contrary, it was unexpectedly found that the molecular weight of the polymer and the conversion of the monomers are increased with the increase of the monomer concentration in the process of this invention. Generally, the molecular weight of the polymer increases almost proportionally with the monomer concentration until the ratio of monomers to the solvent by volume reaches about 60/40, and then the molecular weight becomes approximately constant. The conversion of the monomers increases almost proportionally with the monomer concentration until the ratio of the monomers to the solvent by volume reaches about 20/80, and then the conversion becomes approximately constant until said ratio again reaches near 100/0 where the conversion again increases.

Therefore, by the process of this invention, a high molecular weight copolymer is produced in an excellent yield by increasing the monomer concentration, especially using isobutylene itself as the solvent.

The isobutylene and methylheptatriene copolymer of this invention may be recovered from the reaction mixture when the polymerization reaction has proceeded to a predetermined stage by adding a shortstop, such as, water or alcohol to the reaction mixture, and then separating the formed polymer in a conventional manner.

Comparing a copolymer of isobutylene and methylheptatriene having relatively lower unsaturation, such as, 5%, with a commercial butyl rubber, it was found that the copolymer of this invention has a higher cure rate and a lower tendency of cure state reversion and this copolymer has the same degree of air permeability and other mechanical properties as the butyl rubber.

Further, the copolymer of this invention has a relatively small peeling strength, and this shows that the copolymer of this invention is useful for tire tubes.

The following examples will illustrate preferred embodiments of this invention, but it is to be understood that this invention is not intended to be limited thereto.

In the examples, the intrinsic viscosity [η] is measured in toluene at 30° C., and the degree of unsaturation of the copolymer is determined by the monochloro-iodide method which is described in Analytical Chemistry vol. 22, page 995 (1950).

EXAMPLE 1

Into a 200 ml. cylindrical flask, 67 ml. of pentane and 0.3 mole of a mixture of isobutylene and methylheptatriene were charged. The monomer ratio was varied in each run. The contents were cooled to —100° C. in a pentane liquid nitrogen bath. Into the flask, 0.5 ml. of an 0.5 mole/liter concentration solution of trichloroacetic acid in pentane, and then 1 ml. of a 1 mole/liter concentration solution of titanium tetrachloride in pentane, and then 1 ml. of a 1 mole/liter concentration solution of titanium tetrachloride in pentane, were added. After the addition, the resulting mixture was maintained at −100° C., for 2 hours while stirring. Then into the reaction mixture there was added a small amount of methanol to terminate the polymerization reaction. The terminated reaction mixture was poured into a large amount of methanol containing a small amount of phenyl-β-naphthylamine as an antioxidant, to precipitate the copolymer produced. The copolymer of isobutylene and methylheptatriene precipitated was separated from methanol, washed, and dried.

The monomer ratio used and the results obtained are shown in Table 1.

TABLE 1

| Run No. | Methylheptatriene/Isobutylene (Molar ratio) | Conversion (percent) | [η] | Degree of unsaturation (percent) |
|---|---|---|---|---|
| 1 | 2/98 | 37 | 1.91 | 4.9 |
| 2 | 5/95 | 24 | 0.94 | 9.8 |
| 3 | 10/90 | 14 | 0.79 | 18 |
| 4 | 15/85 | 16 | 0.61 | 24 |
| 5 | 20/80 | 10 | 0.56 | 28 |

EXAMPLE 2

This example is to illustrate the effect of this invention when the concentrations of the monomers are varied. The polymerization recipe and reaction conditions used were as follows:

n-Pentane: Varied
Monomers: Varied
Titanium tetrachloride: 1.0 millimole
Trichloroacetic acid: 0.25 millimole
Polymerization temperature: −100° C.
Polymerization time: 1 hour The polymerization reaction was conducted in the same manner as described in Example 1. In this example, the total amount of solvent and monomers was maintained to 100 ml. all through the runs, and the molar ratio of methylheptatriene/isobutylene was 5/95.

The amounts of monomers and the results obtained are shown in Table 2.

TABLE 2

| Run No. | Monomer/Solvent (Molar ratio) | Conversion (percent) | [η] | Degree of unsaturation (percent) |
|---|---|---|---|---|
| 1 | 0.1 | 12 | 0.6 | 14 |
| 2 | 0.2 | 23 | 0.8 | 12 |
| 3 | 0.3 | 33 | 1.1 | 12 |
| 4 | 0.4 | 38 | 1.8 | 11 |

EXAMPLE 3

Example 2 was repeated but the following polymerization recipe and reaction conditions were used:

n-Pentane: Varied
Monomers: Varied
Titanium tetrachloride: 0.5 millimole
Trichloroacetic acid: 0.125 millimole
Polymerization temperature: −100° C.
Polymerization time: 1 hour
Total amount of solvent and monomers: 50 ml.
Methylheptatriene/isobutylene: 15/85 (molar ratio)

The monomer concentration and the results obtained are shown in Table 3.

TABLE 3

| Run No. | Monomers/Solvent (Volume ratio) | Conversion (percent) | [η] | Degree of unsaturation (percent) |
|---|---|---|---|---|
| 1 | 20/80 | 30 | 0.4 | 22 |
| 2 | 40/60 | 31 | 0.8 | 23 |
| 3 | 60/40 | 33 | 1.2 | 24 |
| 4 | 80/20 | 34 | 1.2 | 25 |
| 5 | 100/0 | 42 | 1.1 | 23 |

EXAMPLE 4

The copolymer of isobutylene and methylheptatriene was prepared in the same manner as described in Example 1, using various phenols and organic carboxylic acids, instead of trichloroacetic acid, as the second catalyst component.

The polymerization recipe and the reaction conditions used were as follows:

n-Petane: 23 ml.
Isobutylene: 0.285 mole
Methylheptatriene: 0.015 mole
Titanium tetrachloride: 0.5 millimole
Second catalyst component: 0.5 millimole
Polymerization temperature: −100° C.
Polymerization time: 1 hour The second catalyst components used and the results obtained are shown in Table 4.

TABLE 4

| Run No. | Second Catalyst Component | Conversion (percent) | [η] | Degree of Unsaturation (percent) |
|---|---|---|---|---|
| 1. | Dichloroacetic acid | 34.1 | 2.00 | 9.5 |
| 2. | Monochloroacetic acid | 31.9 | 2.70 | 8.8 |
| 3. | Formic acid | 30.0 | 2.50 | 9.7 |
| 4. | Oxalic acid | 8.9 | 2.79 | 8.7 |
| 5. | Maleic acid | 12.7 | 2.55 | 8.8 |
| 6. | Phenol | 17.9 | 2.12 | 9.1 |
| 7. | 2,4-dinitrophenol | 9.8 | 2.73 | 8.6 |
| 8. | Picric acid | 12.5 | 2.68 | 8.7 |
| 9. | Hydroquinone | 9.2 | 2.78 | 8.6 |
| 10. | Resorcine | 10.7 | 3.00 | 8.5 |
| 11. | p-Chlorophenol | 22.9 | 1.83 | 8.6 |
| 12. | m-Chlorophenol | 22.8 | 1.66 | 9.7 |
| 13. | o-Cresol | 20.0 | 1.47 | 9.7 |
| 14. | m-Cresol | 16.8 | 1.41 | 9.8 |

EXAMPLE 5

An isobutylene and methylheptatriene copolymer of 4.0% by mole unsaturation and of Mooney viscosity of 72 $ML_{1+4}$ (100° C.), produced by copolymerizing isobutylene and methylheptatriene in pentane in the presence of a catalyst of titanium tetrachloride and trichloroacetic acid, was compounded according to the following recipe, and vulcanized at 145° C., for ap redtermined period of time.

For comparison, a commercial butyl rubber (Enjay Butyl 218, Money viscosity of 74.5 $ML_{1+4}$ (100° C.), and degree of unsaturation of 1.5–2.0%) was compounded and vulvanized under the same conditions.

Recipe: Parts by weight
Polymer _____ 100
Carbon black (HAF) _____ 50
Extender oil _____ 5
Zinc oxide _____ 3
Stearic acid _____ 2
Antioxidant D [1] _____ 1
Sulfur _____ 2.0
Accelerator M [2] _____ 0.5
Accelerator TT [3] _____ 1.0

[1] Phenyl-B-Naphthylamine.
[2] 2-mercapto-benzothiazole.
[3] Tetrathiam disulfide.

The properties of the vulcanizates were tested and the results obtained are shown in Table 5.

TABLE 5

| | Time of Vulcanziation (Min.) | | |
|---|---|---|---|
| | 30 | 45 | 60 |
| 300% Modulus (kg./cm.) Sample Bf this Invention | 52 | 67 | 85 |
| Do.* | 44 | 53 | 62 |
| Tensile Strength (kg./cm.²) Sample of this invention | 183 | 192 | 189 |
| Do.* | 173 | 175 | 166 |
| Elongation (percent) Sample of this of this Invention | 770 | 700 | 590 |
| Do.* | 810 | 780 | 710 |

* Control.

The samples thus obtained by vulcanizing at 145° C., for 60 mins. were tested for their adhesive properties. The test conditions used were as follows:

Adhesion temperature: 170° C.
Adhesion pressure: 40–50 kg./cm.²
Rate of peeling: 500 mm./min.

The results obtained are shown in Table 6.

TABLE 6

|  | Sample of this Invention | | Sample of Control | |
|---|---|---|---|---|
| Adhesion Time (hr.) | 2 | 6 | 2 | 6 |
| Peeling Strength (kg./cm.²) | 1.1 | 1.4 | 2.3 | *1.7 |

* Peeling strength is decreased due to the degradation of the rubber.

What is claimed is:
1. A copolymer of isobutylene and 5-methylheptatriene-1,3,6 which consists essentially of greater than about 50 mole percent isobutylene, the remainder being 5-methylheptatriene-1,3,6.
2. A copolymer according to claim 1, in which the copolymer consists essentially of from 85 to 99.5 mole percent of isobutylene and from 15 to 0.5% mole percent of 5-methylheptatriene-1,3,6.
3. A process for producing a copolymer of isobutylene and 5-methylheptatriene-1,3,6 which comprises contacting a mixture of isobutylene anl 5-methylheptatriene-1,3,6 with a catalyst prepared by mixing (1) titanium tetrachloride, and (2) at least one compound selected from the group consisting of (a) phenols and (b) organic carboxylic acids having a strong acidity, in an aliphatic hydrocarbon solvent.
4. A process according to claim 3, in which the phenol is represented by the following general formula:

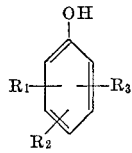

wherein each of $R_1$, $R_2$ and $R_3$ is a member selected from the group consisting of hydrogen, a methyl group, a nitro group, and chlorine.
5. A process according to claim 3, in which the organic carboxylic acid having strong acidity is an acid having a value of $-\log K$ less than 4, wherein K is the dissociation constant of the acid at 25° C.
6. A process according to claim 3, in which the phenol is a compound selected from the group consisting of phenol, p-chlorophenol, m-chlorophenol, o-cresol and m-cresol.
7. A process according to claim 3, in which the carboxylic acid is one selected from the group consisting of formic acid monochloroacetic acid, dichloroacetic acid, and trichloroacetic acid.
8. A process according to claim 3, in which the aliphatic hydrocarbon solvent is a member selected from the group consisting of propane, butane, pentane and hexane.
9. A process according to claim 3, in which the aliphatic hydrocarbon solvent is isobutylene.
10. A process according to claim 3, in which the compound selected from the group consisting of phenols and organic carboxylic acids, is used in an amount from 0.05 to 5 moles per one mole of titanium tetrachloride.
11. A process according to claim 3, in which the compound selected from the group consisting of phenols and organic carboxylic acids, is used in an amount from 0.1 to 2 moles per one mole of titanium tetrachloride.
12. A process according to claim 3, in which the polymerization reaction is conducted at a temperature from $-50°$ to $-130°$ C.
13. A process according to claim 3, in which the polymerization reaction is conducted at a temperature from $-80°$ to $-110°$ C.
14. A process according to claim 3, in which the titanium tetrachloride is used in an amount from 0.5 to 5 millimoles per one mole of the total monomers.
15. A process according to claim 3, in which the amount of 5-methylheptatriene-1,3,6 in the monomer mixture to be polymerized is in the range from 0.5 to 15% per mole.
16. The copolymer of claim 1 which consists essentially of greater than about 80 mole percent isobutylene, the remainder 5-methylheptatriene-1,3,6.

References Cited

FOREIGN PATENTS 671,107   2/1966   Belgium.

JOSEPH L. SCHOFER, Primary Examiner

R. S. BENJAMIN, Assistant Examiner